United States Patent
Morris et al.

(10) Patent No.: US 9,752,569 B1
(45) Date of Patent: Sep. 5, 2017

(54) SYSTEMS AND METHODS FOR DETECTING AND RESOLVING IMPENDING FAILURES IN A SUMP PUMP

(71) Applicant: STATE FARM MUTUAL AUTOMOBILE INSURANCE COMPANY, Bloomington, IL (US)

(72) Inventors: Scott C. Morris, Bloomington, IL (US); Shawn M. Call, Bloomington, IL (US); Jackie O. Jordan, II, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/601,764

(22) Filed: Jan. 21, 2015

Related U.S. Application Data

(63) Continuation of application No. 14/521,596, filed on Oct. 23, 2014, now Pat. No. 9,002,528, which is a continuation of application No. 14/281,141, filed on May 19, 2014, now Pat. No. 8,892,263.

(51) Int. Cl.
- *F04B 49/06* (2006.01)
- *G05D 9/12* (2006.01)

(52) U.S. Cl.
CPC .......... *F04B 49/065* (2013.01); *G05D 9/12* (2013.01)

(58) Field of Classification Search
None
See application file for complete search history.

(56) References Cited

U.S. PATENT DOCUMENTS

| | | | | |
|---|---|---|---|---|
| 4,222,711 A * | 9/1980 | Mayer | ............... | F04B 49/06 417/36 |
| 4,795,552 A * | 1/1989 | Yun et al. | ............... | 209/319 |
| 5,236,038 A * | 8/1993 | Clemishire | ............... | E21B 31/107 166/178 |
| 5,426,720 A * | 6/1995 | Bozich | ............... | F16F 15/02 318/114 |
| 5,672,050 A * | 9/1997 | Webber | ............... | F04B 49/022 417/18 |
| 6,330,525 B1 * | 12/2001 | Hays | ............... | G05B 23/0235 376/245 |
| 7,309,216 B1 * | 12/2007 | Spadola, Jr. | ............... | F04B 49/02 417/18 |
| 7,755,318 B1 | 7/2010 | Panosh | | |
| 2003/0049134 A1 * | 3/2003 | Leighton | ............... | F04D 29/2222 417/40 |

(Continued)

*Primary Examiner* — Robert Fennema
*Assistant Examiner* — Jay Jung
(74) *Attorney, Agent, or Firm* — Marshall, Gerstein & Borun LLP; Randall G. Rueth

(57) ABSTRACT

A method and system detects and resolves impending failures in a sump pump. The method and system may measure a current water level in a sump basin, which houses the sump pump. The current water level may be determined by a water level sensor placed slightly above a set water level mark in the sump basin. If the current water level is above the set water level mark, the method and system may activate a mechanical shaker that produces vibrations to physically shake the sump pump. If the current water level is below the set water level mark, the method and system may determine potential problems associated with the sump pump by analyzing a motor of the sump pump.

21 Claims, 4 Drawing Sheets

(56) References Cited

U.S. PATENT DOCUMENTS

2004/0090197 A1\* 5/2004 Schuchmann ...... F04D 15/0209
  318/432
2007/0079470 A1\* 4/2007 Rippl et al. ..................... 15/320

\* cited by examiner

SYSTEMS AND METHODS FOR DETECTING AND RESOLVING IMPENDING FAILURES IN A SUMP PUMP

CROSS-REFERENCE TO RELATED APPLICATIONS

This application is a continuation application of U.S. patent application Ser. No. 14/521,596, filed on Oct. 23, 2014, which is a continuation application of U.S. patent application Ser. No. 14/281,141, now U.S. Pat. No. 8,892, 263 and entitled "Systems and Methods for Detecting and Resolving Sump Pump Failures," filed on May 19, 2014. The present application claims priority from all above-referenced applications and the disclosures of all above-referenced applications are hereby expressly incorporated herein by reference.

TECHNICAL FIELD

The present application relates generally to sump pumps and, more particularly, to systems and methods for detecting and resolving sump pump failures.

BACKGROUND

A sump pump is a type of pump used to remove water that has accumulated in the basement of a home. The sump pump sends the water into pipes that lead away from the home so that potential basement flooding may be avoided. As such, failures in the sump pump can have disastrous consequences including water damages and insurance losses. However, sump pump failures often occur without prior warning or may not be discovered until significant damage has already been done. Unfortunately, many currently available sump pump systems are not designed or equipped to automatically detect impending sump pump failures, or remedy such failures even if they are detected.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method for detecting and resolving impending failures in a sump pump may comprise determining, by one or more processors, if a current water level in a sump basin in which the sump pump is disposed has surpassed a set water level, where the current water level is determined by a water level sensor placed at a short distance above the set water level. In response to determining that the current water level in the sump basin has surpassed the set water level, the method may activate, by one or more processors, a mechanical shaker attached to the sump pump for one or more operating cycles. In response to determining that the current water in the sump basin has not surpassed the set water level, the method may determine, by one or more processors, potential problems associated with the sump pump by analyzing a motor of the sump pump.

A non-transitory computer-readable storage medium may include computer-readable instructions to be executed on one or more processors of a system for detecting and resolving impending failures in a sump pump. The instructions when executed, may cause the one or more processors to determine if a current water level in a sump basin in which the sump pump is disposed has surpassed a set water level, where the current water level is determined by a water level sensor placed at a short distance above the set water level. In response to determining that the current water level in the sump basin has surpassed the set water level, the instructions when executed, may cause the one or more processors to activate a mechanical shaker attached to the sump pump for one or more operating cycles. In response to determining that the current water in the sump basin has not surpassed the set water level, the instructions when executed, may determine potential problems associated with the sump pump by analyzing a motor of the sump pump.

A system for detecting and resolving impending failures in a sump pump may comprise a sump pump, a water level sensor coupled to the sump pump, a mechanical shaker coupled to the sump pump, and a pump analyzer that includes a memory having instructions for execution on one or more processors. The instructions when executed by the one or more processors, may cause the pump analyzer to determine if a current water level in a sump basin in which the sump pump is disposed has surpassed a set water level as determined by the water level sensor, where the water level sensor is placed at a short distance above the set water level. In response to determining that the current water level in the sump basin has surpassed the set water level, the instructions when executed by the one or more processors may cause the pump analyzer to activate the mechanical shaker for one or more operating cycles. In response to determining that the current water in the sump basin has not surpassed the set water level, the instructions when executed by the one or more processors may determine potential problems associated with the sump pump by analyzing a motor of the sump pump.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Generally speaking, the disclosed system automatically detects and resolves impending failures in sump pump systems. Sump pumps are used in areas where basement flooding is a recurring problem. A typical sump pump system comprises a submersible impeller type pump disposed in a sump basin. The sump basin is a holding cavity formed by digging a recess into the basement floor of a home. The sump basin acts both to house the sump pump and to collect accumulated water. Water may accumulate in the sump basin when excessive amounts of rain, snow melt or ground water saturate the soil adjacent to the basement foundation. Water may also enter the sump basin via drainage pipes that have been placed into the ground to divert any excess water into the sump basin before the water can begin to permeate the foundation walls, or water may enter the sump basin through porous or cracked walls. In any event, the pumping action of a sump pump removes water accumulated in the sump basin so that potential basement flooding may be avoided. When water is pumped out of the sump basin, the water is discharged via pipes to an area away from the home such as a municipal storm drain or a dry well.

Figure 1:
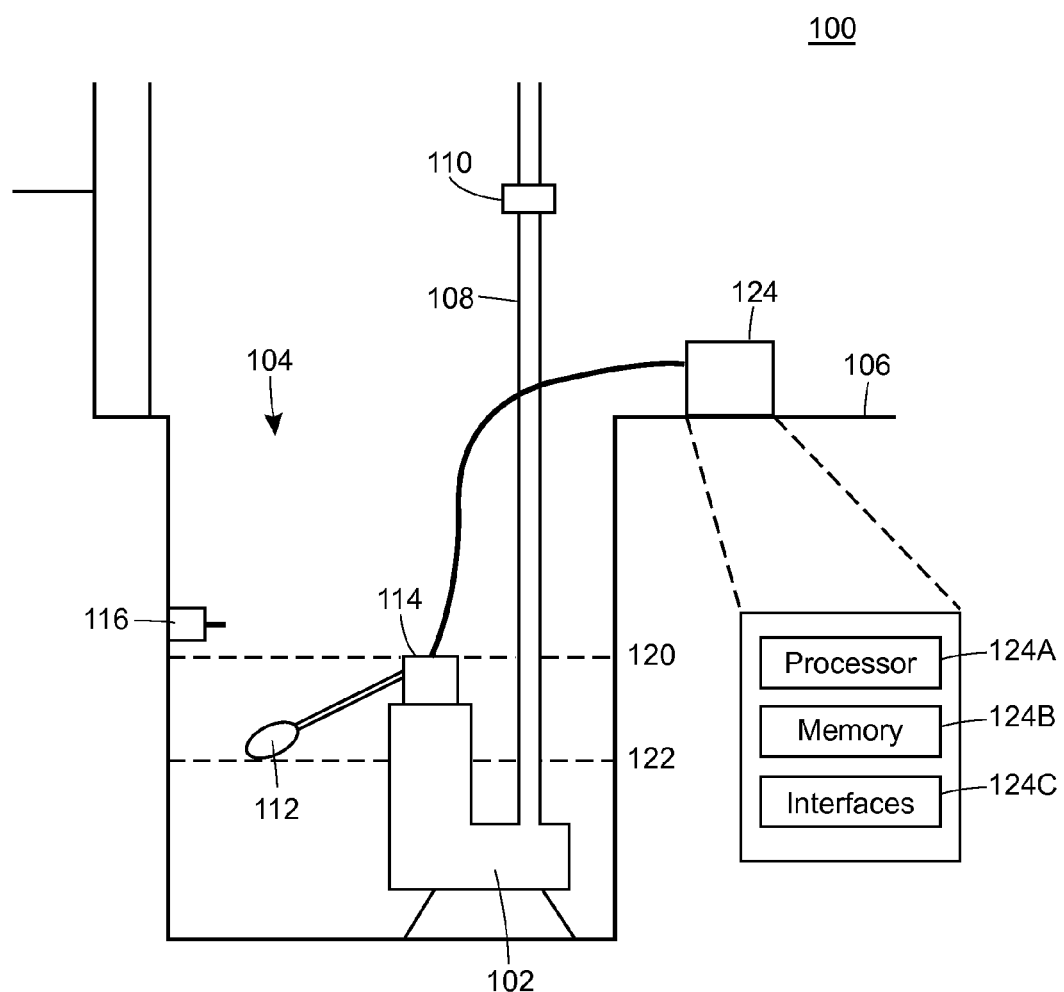
FIG. 1 illustrates an example sump pump system.

FIG. 1 illustrates an example sump pump system 100, which can be used to remove water accumulated in the basement of a home. The example sump pump system 100 includes a sump pump 102 located in a sump basin 104. As shown in FIG. 1, the sump basin 104 is a well-like cavity or hole formed through a basement floor 106 of the home. The example sump pump system 100 also includes a discharge pipe 108 connected to the sump pump 102 to carry water out of the basin 104. The discharge pipe 108 extends upward from the sump pump 102 through a check valve 110 and then out of the home. The check valve 110 allows water to flow up through the discharge pipe 108, but will not allow the water in the discharge pipe 108 to flow back into the sump basin 104 when the sump pump 102 is off. Usually, the opening of the sump basin 104 is protected by a cover to prevent objects from falling into the basin, and to keep noxious gases (e.g. radon) from entering the basement.

Generally, the sump pump 102 may be electrically powered and hardwired into the electrical system of the home. Additionally or alternatively, the sump pump 102 may be powered by a battery or other independent power source. The operation of the sump pump 102 is controlled by a pump activation switch 112 in response to water rising to a preset level in the basin 104. The preset level is determined by the placement of the pump activation switch 112. In FIG. 1, the pump activation switch 112 is shown in the form of a float switch, although other technologies such as liquid level sensors may also be used.

As shown in FIG. 1, the pump activation switch 112 is connected to a motor 114 of the sump pump 102. The motor 114 energizes to begin pumping water when the current water level in the basin 104 reaches a high water level 120 (e.g., when the rising water lifts the pump activation switch 112 to the high water level 120). As water is pumped out of the basin 104, the current water level drops to a low water or initial level 122 (e.g., as the falling water carries the pump activation switch 112 back to the initial level 122). The motor 114 de-energizes or shuts off at the initial level 122 and the water level ceases to drop further.

FIG. 1 also shows a water level sensor 116, which is placed a short distance (e.g., ¾ inch above) above the high water level 120 in the sump basin 104. The function and operation of the water level sensor 116 is described in more detail below. Additionally, while the sump pump 102 in FIG. 1 is shown as a submersible type sump pump (e.g., where the motor 114 and the sump pump 102 are mounted inside the basin 104), the sump pump 102 in general may be any type of sump pump, such as a pedestal type sump pump that is mounted above or outside of the basin 104.

When the sump pump 102 fails, flooding may ensue as water fills up the sump basin 104 and overflows into the basement. The amount of water that enters the basement can vary from a few inches to several feet. Thus, the resulting water damage may be considerable for which adequate insurance coverage is usually limited or unavailable. Accordingly, the ability to detect and resolve impending sump pump failures before they occur is of great importance.

In general, the sump pump 102 may fail because of a failure in the motor 114, which renders the entire pump inoperable. The failure in the motor 114 may be caused by various factors such as age, fatigue, poor maintenance, etc. Generally, as a motor begins to fail, characteristic changes may appear in the electrical load waveform of the motor. Thus, one mechanism to detect impending sump pump failures is to analyze the electrical load waveform of the motor 114 for meaningful signatures that may indicate potential problems.

To this end, FIG. 1 shows a pump analyzer 124 connected to the motor 114, which may be used to detect impending failures associated with the motor 114. The pump analyzer 124 includes a processor 124A, a memory 124B, and one or more interfaces 124C. The memory 124B stores instructions, data and information that may be executed by the processor 124A to operate the pump analyzer 124. The one or more interfaces 124C may include various interfaces such as a motor interface that allows the pump analyzer 124 to collect or receive the electrical load waveform of the motor 114, a user interface that allows a user to interact with the pump analyzer 124, a network interface that allows the pump analyzer 124 to communicate with other devices or peripheral equipment, etc.

In one embodiment, to analyze the electrical load waveform of the motor 114 for meaningful signatures, the pump analyzer 124 may perform a frequency analysis, such as fast Fourier transform (FFT) or the like, on the motor current or voltage. From the frequency analysis, the pump analyzer 124 may look for certain harmonics or frequency components that may show up as the motor 114 begins to experience failure. For example, the pump analyzer 124 may look for the presence of high frequency spikes, which may indicate potential problems such as motor instability.

In another embodiment, the pump analyzer 124 may analyze the electrical load waveform of the motor 114 for meaningful signatures by comparing the electrical load waveform to one or more reference waveforms in order to ascertain whether or not the motor 114 is operating as intended. The one or more reference waveforms may include a standard waveform that indicates the ideal operation of the motor 114. The standard waveform may be established using factory test data from a manufacturer. Different manufacturers may create different standard waveforms for the pumps or motors that they produce. All of the different standard waveforms may be pre-stored in the memory 124B for use by the pump analyzer 124. Alternatively or additionally, the different standard waveforms may be stored in an external database accessible by the pump analyzer 124. As such, when needed, the pump analyzer 124 may communicate with the external database, via a network connection, to access and/or retrieve the different standard waveforms. Accordingly, the pump analyzer 124 may determine potential problems with the motor 114 if the electrical load waveform of the motor 114 is determined to be different or deviates from the standard waveform.

Alternatively or additionally, the one or more reference waveforms may include a baseline waveform that indicates the initial operation of the motor 114. For example, the pump analyzer 124 may capture the initial condition of the motor 114, either during set-up time or during the first few operating cycles, and store the initial motor condition as the baseline waveform in the memory 124B. Thus, as the motor 114 operates, the pump analyzer 124 may compare the most recent electrical load waveform of the motor 114 to the baseline waveform. If the comparison produces a large variance or a variance that is outside of a tolerance limit, then the pump analyzer 124 may determine that potential problems may exist for the motor 114. The tolerance limit can be adjusted as needed. For example, the tolerance limit may be predefined at a factory, or set according to a user.

In still another embodiment, the pump analyzer 124 may analyze the electrical load waveform of the motor 114 for meaningful signatures by evaluating values associated with the electrical load waveform (e.g., average value, peak value, root mean square value, etc.). For example, the pump analyzer 124 may calculate and monitor the average value of the motor current or voltage over a specified time period. Accordingly, if the calculated average value stays within a predefined level over the specified time period, then the pump analyzer 124 may determine that the motor 114 is functioning properly. On the other hand, if the calculated average value rises above, drops below or otherwise fluctuates beyond the predefined level over the specified time period, then the pump analyzer 124 may determine that the motor 114 is experiencing potential problems that may lead to a failure. Of course, the predefined level can be set or adjusted as needed.

Generally, the pump analyzer 124 may perform any of the analysis methods described above either continuously or on an interval basis (e.g., every 5 minutes, every hour, every day, etc.). It is understood that the above example embodiments are described for illustration purposes. They are not exclusive, and more than one such embodiments may be used or coexist within a single pump analyzer 124.

While FIG. 1 shows the pump analyzer 124 as being a separate unit from the sump pump 102, in some embodiments, the pump analyzer 124 may be integrated with or be part of the sump pump 102. Further, in some embodiments, the pump analyzer 124 may perform the analysis remotely. In this scenario, the pump analyzer 124 may send the electrical load waveform of the motor 114 to be stored at a server (not shown in FIG. 1) via a network such as the Internet, a local area network, a wired or wireless network, etc. Once received, the server may process and analyze the electrical load waveform of the motor 114 by using any of the analysis methods described above.

Figure 2:
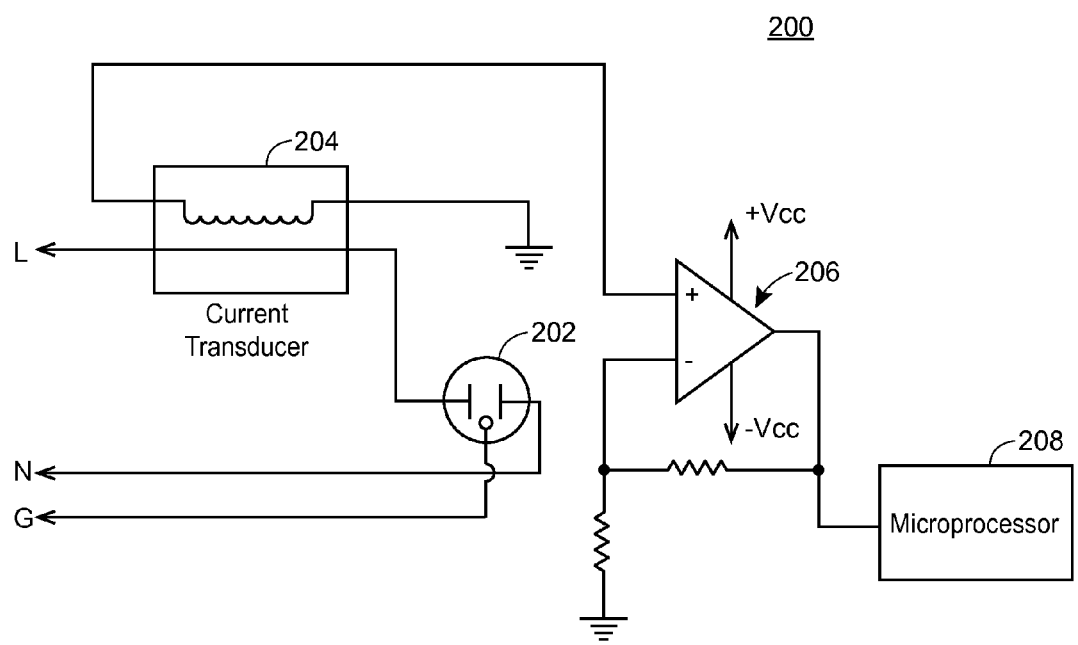
FIG. 2 illustrates an example circuit diagram for detecting impending sump pump failures.

FIG. 2 illustrates an example circuit diagram 200 for detecting impending sump pump failures. In particular, the example circuit diagram 200 may be used to detect impending failures associated with a motor such as the motor 114 of FIG. 1. With reference to FIG. 1, the example circuit diagram 200 may be implemented as part of the pump analyzer 124. In the embodiment of FIG. 2, the example circuit diagram 200 includes an electrical contact 202, a current transducer 204, an amplifier circuit 206, and a microprocessor unit 208. The electrical contact 202 represents the output of the motor 114 where the electrical load waveform of the motor 114 may be obtained. The current transducer 204 converts the obtained electrical load waveform of the motor 114 into a signal that can be used by the microprocessor unit 208. For example, the current transducer 204 converts the measured electrical current of the motor 114 into an analog signal, which is then amplified by using the amplifier circuit 206. The output of the amplifier circuit 206 is subsequently fed into the microprocessor unit 208. In this manner, the microprocessor unit 208 may process the electrical load waveform of the motor 114 to determine potential problems that may exist in the motor 114. In some embodiments, the example circuit diagram 200 may include filters, such as low-pass filters that may be connected to the electrical contact 202, to remove noise or other unwanted interference signals. It should be noted that the circuit components (e.g., the components 204, 206, 208) in FIG. 2 are shown for illustration purposes. In other embodiments or scenarios, fewer or more circuit components may be used, as well as other circuit components with other configurations.

Aside from the failure of the motor 114, the sump pump 102 may fail because of soft mechanical failures. For example, sediment or debris build-up may cause the motor impeller to stall, and thus rendering the sump pump 102 unable to pump water even though the motor 114 is energized. As such, another mechanism to detect impending sump pump failures is to monitor for the occurrence of soft mechanical failures.

Generally, soft mechanical failures may be identified or detected indirectly. In an embodiment, soft mechanical failures may be detected by using a properly placed water level sensor, such as the water level sensor 116 of FIG. 1. In operation, if the water level sensor 116 does not detect water, then the water level in the basin 104 is deemed adequate. In other words, the sump pump 102 is either working properly to constantly pump water out of the basin 104, or the water level is not yet high enough to activate the pump. In any event, it can be assumed that the sump pump 102 is not experiencing any soft mechanical failure. On the other hand, if the water level sensor 116 detects water, then water is about to overflow the basin 104. In other words, a dangerous level of water is present in the basin 104, which may be due to a soft mechanical failure that has rendered the sump pump 102 unable to pump water.

Additionally, functions of the pump analyzer 124 of FIG. 1 may be used together with the water level sensor 116 to detect certain soft mechanical failures, such as when the motor 114 becomes stuck and runs indefinitely. This may be due to a mechanical malfunction of the pump activation switch 112 or another activation element. In this scenario, when the water level sensor 116 does not detect water, the pump analyzer 124 may analyze the electrical load waveform of the motor 114 to determine how long the motor 114 is running. In general, if the sump pump 102 is working properly, then the motor 114 will automatically shut off when the falling water carries the pump activation switch 112 back to the initial level 122. However, if the pump activation switch 112 jams or otherwise fails, then the motor 114 may become stuck and continue to run for a long time. Thus, if the water level sensor 116 is not detecting water but the pump analyzer 124 is detecting a long period of run time on the part of the motor 114 (e.g., if the run time of the motor 114 exceeds a certain length of time), then the sump pump 102 may be deemed to be experiencing a soft mechanical failure.

Once identified or detected, a soft mechanical failure in a sump pump may be resolved by shaking the sump pump. For example, a simple mechanical shake can often "break loose" a build-up of debris or a jam or stall in the sump pump that is the cause of the soft mechanical failure. FIGS. 3(*a*) and 3(*b*) illustrate different configurations for a mechanical shaker 302 that can be used for this purpose. The mechanical shaker 302 may be in the form of an electromechanical vibration device (e.g. a linear motor) that physically agitates or shakes the sump pump.

Figure 3A:
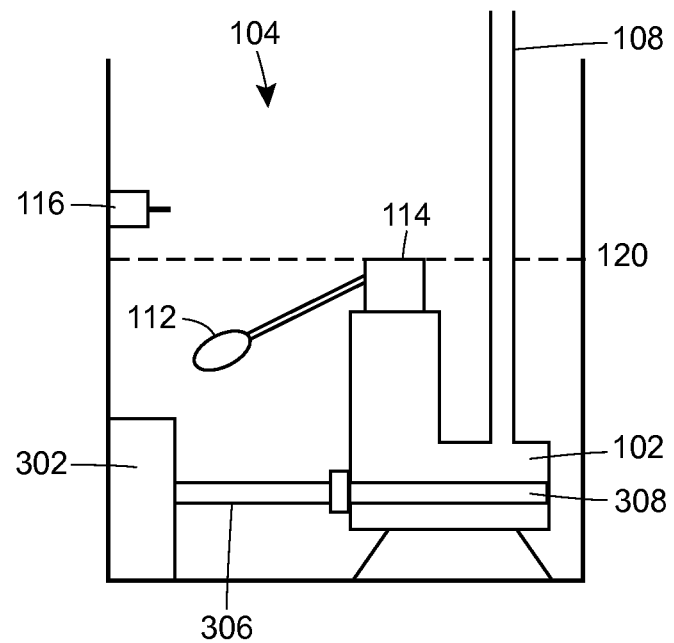
FIGS. 3(a) and 3(b) illustrate example configurations for a mechanical shaker that can be used to resolve detected sump pump failures.
Figure 3B:
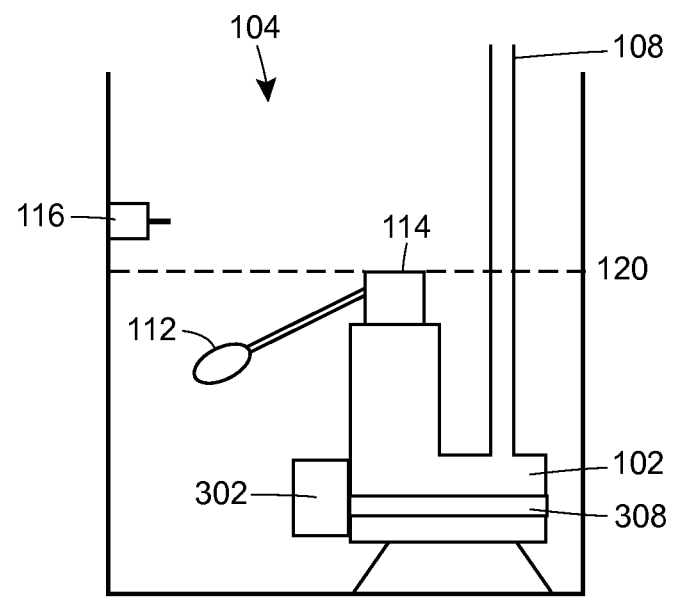

Each of FIGS. 3(*a*) and 3(*b*) is illustrated with respect to FIG. 1. As such, each of FIGS. 3(*a*) and 3(*b*) shows the sump pump 102 disposed in the sump basin 104 along with the pump activation switch 112, the motor 114, and the discharge pipe 108. Each of FIGS. 3(*a*) and 3(*b*) also shows the water level sensor 116 being placed at a short distance or just above the high water level 120 in the basin 104. In FIG. 3(*a*), the mechanical shaker 302 is configured with a shaker arm 306 that extends horizontally. The shaker arm 306 is then attached to the body of the sump pump 102 by using clamps 308. When energized, vibrations produced by the mechanical shaker 302 are transferred to the sump pump 102 via the shaker arm 306. In FIG. 3(b), the mechanical shaker 302 is configured to attach to the sump pump 102 directly. The mechanical shaker 302 may be secured to the body of the sump pump 102 by using the clamps 308, for example. When energized, vibrations produced by the mechanical shaker 302 are imparted directly onto the sump pump 102.

The intensity and duration of the vibration produced by the mechanical shaker 302 may be set or adjusted as desired. For example, the mechanical shaker 302 may be set to vibrate intensely and continuously for a short burst of time. As another example, the mechanical shaker 302 may be set to vibrate in multiple operating cycles (e.g., 3 or 5 cycles), with each cycle producing a different level of vibration intensity (e.g., an increase in the level of intensity going from the first cycle to the last cycle). Further, different types of vibration profiles may be specified such as a sine sweep, random vibration, synthesized shock, etc.

In both FIGS. 3(a) and 3(b), the mechanical shaker 302 is shown as a standalone unit that may be retrofitted or added to the sump pump 102. In some embodiments, the mechanical shaker 302 may be integrated with or be part of the sump pump 102. Further, both the mechanical shaker 302 and the water level sensor 116 may be connected to the pump analyzer 124 so that the pump analyzer 124 can control the operation of the mechanical shaker 302 and the water level sensor 116.

The mechanical shaker 302 may be automatically activated in response to detected soft mechanical failures, such as when water overflow is detected by the water level sensor 116, or when the motor 114 runs too long (e.g. as determined by the pump analyzer 124) in the absence of any water overflow detection by the water level sensor 116.

The mechanical shaker 302 may also be automatically activated in response to the pump analyzer 124 detecting potential problems with the motor 114. For example, the pump analyzer 124 may determine from analyzing the electrical load waveform of the motor 114 that the motor 114 is about to stall. As such, the pump analyzer 124 may activate the mechanical shaker 302 to try to jolt the motor 114 back to life. Of course, using the mechanical shaker 302 is not the only way to resolve potential problems detected in the motor 114. In some embodiments, the motor 114 may be automatically turned on and off in an attempt to restart the motor 114 if potential problems are detected by the pump analyzer 124.

Moreover, when potential problems with the motor 114 and/or soft mechanical failures are identified or detected, the pump analyzer 124 may alert or warn a homeowner or user. For example, the pump analyzer 124 may send an alert message (e.g., a visual message, an audio message, a text message, an email message, etc.) to a device that the user is using (e.g., a mobile phone, a computer, etc.). The message may specify the impending sump pump failures and any automatic actions that were taken to resolve or remedy the failures. In this manner, the user is notified or made aware of the situation.

In some embodiments, the pump analyzer 124 may be integrated with or be part of a home automation system. As such, the pump analyzer 124 may communicate data and information to the home automation system regarding impending sump pump failures and automatic actions that were taken in response to the impending failures. The home automation system may in turn inform the user and, if desired, instruct the pump analyzer 124 to perform further actions based on any direction or feedback from the user. Similarly, the user may access the home automation system to view and configure the pump analyzer 124 or any of the components connected to or controlled by the pump analyzer 124.

Communication with the user is also necessary because certain impending sump pump failures cannot be fully resolved. For example, the motor 114 or parts of the sump pump 102 may be physically broken, and thus no amount of shaking by the mechanical shaker 302 can remedy the problem. As such, either the pump analyzer 124 and/or the home automation system may send an alarm message to the user or a qualified technician stating that manual repairs or replacements are needed as soon as possible.

Figure 4:
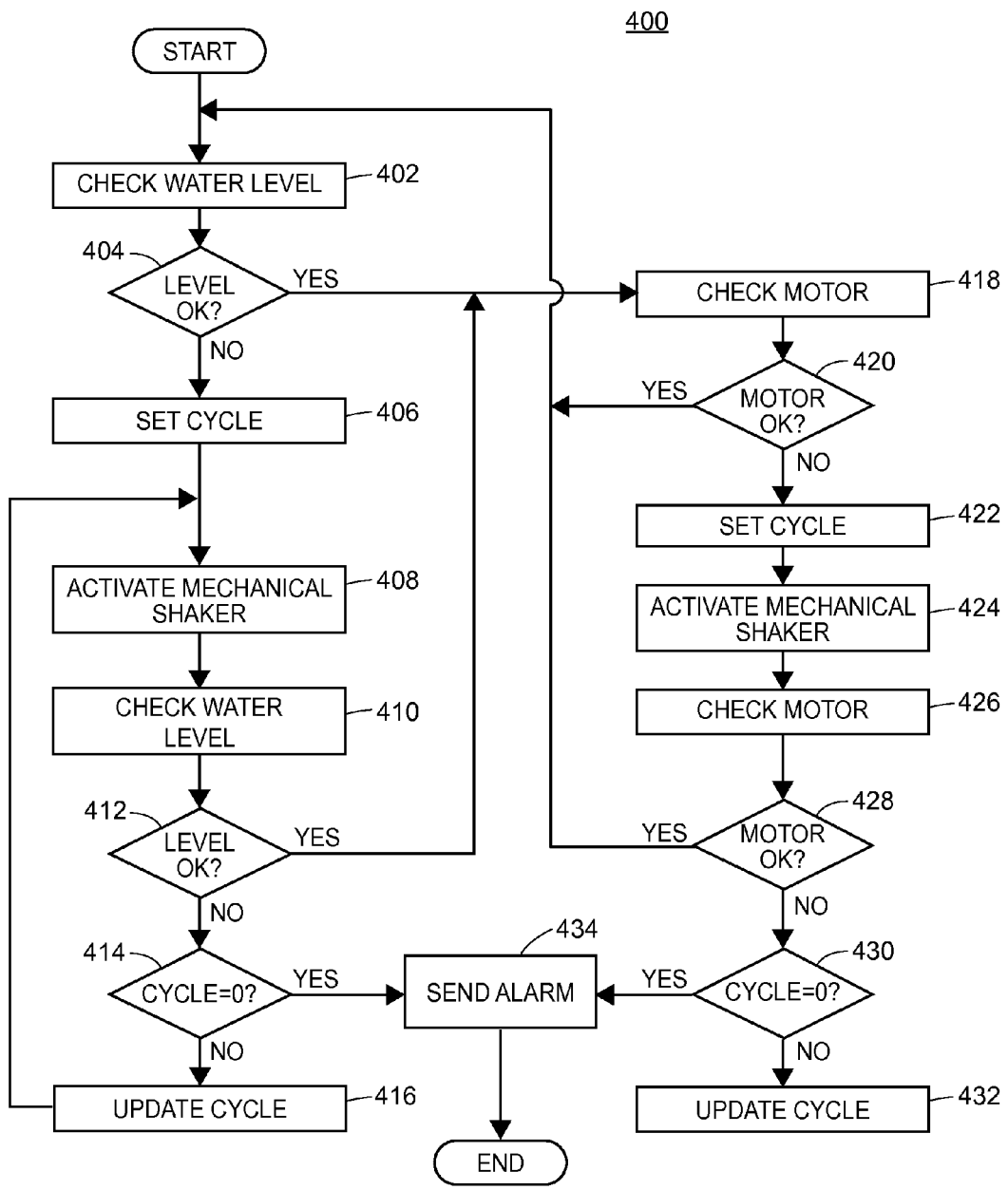
FIG. 4 illustrates a flowchart of an example method for detecting and resolving sump pump failures.

FIG. 4 illustrates a flowchart of an example method 400 for detecting and resolving sump pump failures. The method 400 may include one or more blocks, routines or functions in the form of computer executable instructions that are stored in a tangible computer-readable medium (e.g., 124B of FIG. 1) and executed using a processor (e.g., 124A of FIG. 1). For ease of explanation, FIG. 4 will be described with respect to FIGS. 1-3.

The method 400 may begin by checking the current water level in the sump basin 104 (block 402). Generally, this involves determining if water is being detected by the water level sensor 116. Based on the readings from the water level sensor 116, the method 400 may determine whether or not the current water level in the basin 104 is acceptable (block 404). If the water level is not acceptable, then the method 400 may determine that an overflow of water is imminent, and that most likely a soft mechanical failure has occurred in the sump pump 102.

The method 400 then begins to automatically resolve the soft mechanical failure by setting up the mechanical shaker 302 (block 406). In particular, the method 400 may specify a number of operating cycles for the mechanical shaker 302 to shake the sump pump 102. The method 400 may also specify a duration and intensity for each operating cycle. In an embodiment, the method 400 may establish 3 operating cycles, each of which lasts 15 seconds with moderate shaking intensity. Next, the method 400 may activate the mechanical shaker 302 (block 408). The mechanical shaker 302 produces vibrations for the specified duration in each operating cycle in an attempt to shake loose any jam, stall or debris that is causing the soft mechanical failure.

At the end of the specified duration in each operating cycle, the method 400 may recheck the current water level in the basin 104 (block 410). Based on the readings from the water level sensor 116, the method 400 may determine whether the current water level in the basin 104 is now acceptable or not (block 412). If the water level is not acceptable, then the method 400 may determine that the soft mechanical failure has not been resolved. Subsequently, the method 400 may determine if the number of operating cycles has reached zero (block 414). If the number of operating cycles is not zero, the method 400 may update the iteration on the operating cycles (block 416). The method 400 may then proceed to continue operating the mechanical shaker 302 on the sump pump 102 for the remaining number of cycles at block 408.

If the water level is acceptable at block 412, then the method 400 may determine that the soft mechanical failure has been successfully resolved (e.g., water in the basin 104 has decreased). As such, the method 400 may proceed to check the motor 114 (block 418). The method 400 may also proceed to check the motor 114 if the water level is deemed acceptable at block 404.

At block 418, the method 400 may determine how long the motor 114 is running in the absence of any water overflow detection by the water level sensor 116. This is performed to identify or detect further soft mechanical failures. For example, certain soft mechanical failures, such as a jam in the pump activation switch 112, may cause the motor 114 to become stuck. Thus, to make sure that the sump pump 102 is operating properly, it is necessary to verify that the motor 114 is not running for an indefinite amount of time (e.g., the run time of the motor 114 does not exceed a certain length of time).

In some embodiments, the method 400 may analyze the electrical load waveform of the motor 114 to determine if there are other impending failures associated with the motor 114. For example, the method 400 may analyze the electrical load waveform of the motor 114 by performing one or more of a frequency analysis, a waveform comparison, or an evaluation of waveform values. Here, the purpose is to look for meaningful signatures that may indicate potential problems associated with the motor 114.

Based on the analysis of the motor 114, the method 400 may determine whether or not the motor 114 is operating as intended (block 420). If the motor 114 is operating properly, the method 400 may return to beginning of block 402. On the other hand, if the motor 114 is not operating properly, then the method 400 may proceed to automatically resolve potential problems associated with the motor 114 by setting up the mechanical shaker 302 (block 422). In particular, the method 400 may specify a number of operating cycles for the mechanical shaker 302 to shake the sump pump 102. The method 400 may also specify a duration and intensity for each operating cycle. In an embodiment, the method 400 may establish 3 operating cycles, with each operating cycle lasting 10 seconds, and an increase in shaking intensity from the first cycle to the third cycle. Next, the method 400 may activate the mechanical shaker 302 in an attempt to remedy the potential problems associated with the motor 114 (block 424).

At the end of the specified duration in each operating cycle, the method 400 may recheck the status of the motor 114 (block 426). Based on another analysis of the motor 114, the method 400 may determine whether or not the motor 114 is now operating correctly (block 428). If the motor 114 is operating correctly, the method 400 may return to beginning of block 402. However, if the motor 114 is not operating correctly, then the method 400 may determine that the potential problems associated with the motor 114 have not been resolved. Accordingly, the method 400 may determine if the number of operating cycles has reached zero (block 430). If the number of operating cycles is not zero, the method 400 may update the iteration on the operating cycles (block 432). Subsequently, the method 400 may proceed to continue operating the mechanical shaker 302 on the sump pump 102 for the remaining number of cycles at block 424.

At either blocks 414 and 430, if the method 400 determines that the number of operating cycles has reached zero, but the current water level is still not acceptable or the motor 114 is still not operating correctly, then the method 400 may proceed to send an alarm message (block 434). Here, the failures in the sump pump 102 cannot be fully resolved by simply shaking the sump pump 102 with the mechanical shaker 302. Manual repairs or replacements must be performed instead. Accordingly, the method 400 may send the alarm message to notify a user of the situation.

The following additional considerations apply to the foregoing discussion. Throughout this specification, plural instances may implement functions, routines, or operations structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments or implementations of a system for detecting and resolving sump pump failures for purposes of illustration only. One of ordinary skill in the art will readily recognize from the foregoing discussion that alternative embodiments or implementations of the structures and methods illustrated herein may be employed without departing from the principles described herein.

Upon reading this disclosure, those of skill in the art will appreciate still additional alternative structural and functional designs for a system and method for detecting and resolving sump pump failures can be used as well or instead. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for detecting and resolving impending failures in a sump pump, the method comprising:
    determining, by one or more processors, if a current water level in a sump basin in which the sump pump is disposed has surpassed a set water level, wherein the current water level is determined by a water level sensor placed a short distance above the set water level;
    in response to determining that the current water level in the sump basin has surpassed the set water level, specifying a plurality of operating cycles and accordingly activating a mechanical shaker attached to the sump pump to shake the sump pump in order to produce vibrations in the sump pump to shake loose one or more of a jam, a stall, a malfunction, or a debris build-up in the sump pump, wherein each operating cycle of the mechanical shaker has a specified duration, activating, by one or more processors, the mechanical shaker for one or more of the operating cycles, and at the end of the specified duration in each operating cycle determining if the current water level in the sump basin is acceptable;
    in response to determining that the current water level in the sump basin has not surpassed the set water level or is acceptable, determining, by one or more processors, potential problems associated with the sump pump by analyzing a motor of the sump pump as activated by the one or more processors; and
    in response to determining that the current water level in the sump basin is not acceptable at the end of the plurality of operating cycles as executed by the shaker of the sump pump, sending an alarm message to notify a user.

2. The computer-implemented method of claim 1, wherein determining potential problems associated with the sump pump includes analyzing the motor to detect signatures that indicate potential problems with the motor, and when the signatures that indicate potential problems with the motor are detected, activating the mechanical shaker attached to the sump pump for another one or more operating cycles.

3. The computer-implemented method of claim 1, wherein determining if the current water level in the sump basin is acceptable comprises determining, by one or more processors, if the current water level in the sump basin has dropped to below the set water level at the end of the one or more operating cycles.

4. The computer-implemented method of claim 2, further comprising:
    analyzing, by one or more processors, the motor to determine if the signatures that indicate potential problems with the motor are still present at the end of the another one or more operating cycles; and
    in response to determining that the signatures that indicate potential problems with the motor are still present at the end of the another one or more operating cycles, providing, by one or more processors, an alert message to the user.

5. The computer-implemented method of claim 2, wherein analyzing the motor to detect signatures that indicate potential problems with the motor includes performing a frequency analysis on an electrical load waveform of the motor.

6. The computer-implemented method of claim 2, wherein analyzing the motor to detect signatures that indicate potential problems with the motor includes comparing an electrical load waveform of the motor to one or more reference waveforms.

7. The computer-implemented method of claim 2, wherein analyzing the motor to detect signatures that indicate potential problems with the motor includes evaluating values associated with an electrical load waveform of the motor.

8. The computer-implemented method of claim 1, wherein the mechanical shaker is attached to the sump pump directly.

9. The computer-implemented method of claim 1, wherein the mechanical shaker is attached to the sump pump by an arm that extends from the mechanical shaker.

10. A non-transitory computer-readable storage medium including computer-readable instructions to be executed on one or more processors of a system for detecting and resolving impending failures in a sump pump, the instructions when executed causing the one or more processors to:
    determine if a current water level in a sump basin in which the sump pump is disposed has surpassed a set water level, the current water level is determined by a water level sensor placed a short distance above the set water level;
    in response to determining that the current water level in the sump basin has surpassed the set water level, specify a plurality of operating cycles and accordingly activating a mechanical shaker attached to the sump pump to shake the sump pump in order to produce vibrations in the sump pump to shake loose one or more of a jam, a stall, a malfunction, or a debris build-up in the sump pump, wherein each operating cycle of the mechanical shaker has a specified duration, activate the mechanical shaker for one or more of the operating cycles, and at the end of the specified duration in each operating cycle determine if the current water level in the sump basin is acceptable;
    in response to determining that the current water level in the sump basin has not surpassed the set water level or is acceptable, determine potential problems associated with the sump pump by analyzing a motor of the sump pump as activated by the one or more processors; and
    in response to determining that the current water level in the sump basin is not acceptable at the end of the plurality of operating cycles as executed by the shaker of the sump pump, sending an alarm message to notify a user.

11. The non-transitory computer-readable storage medium of claim 10, wherein the instructions to determine potential problems associated with the sump pump include analyzing the motor to detect signatures that indicate potential problems with the motor, and when the signatures that indicate potential problems with the motor are detected, activating the mechanical shaker attached to the sump pump for another one or more operating cycles.

12. The non-transitory computer-readable storage medium of claim 10, wherein the instructions to determine if the current water level in the sump basin is acceptable include instructions that, when executed, cause the one or more processors to:
   determine if the current water level in the sump basin has dropped to below the set water level at the end of the one or more operating cycles.

13. The non-transitory computer-readable storage medium of claim 11, further including instructions that, when executed, cause the one or more processors to:
   analyze the motor to determine if the signatures that indicate potential problems with the motor are still present at the end of the another one or more operating cycles; and
   in response to determining that the signatures that indicate potential problems with the motor are still present at the end of the another one or more operating cycles, provide an alert message to the user.

14. The non-transitory computer-readable storage medium of claim 11, the instructions further including instructions providing for analyzing the motor to detect signatures that indicate potential problems with the motor including one or more of: (i) performing a frequency analysis on an electrical load waveform of the motor; (ii) comparing the electrical load waveform of the motor to one or more reference waveforms; or (iii) evaluating values associated with the electrical load waveform of the motor.

15. A system for detecting and resolving impending failures in a sump pump, the system comprising:
   a sump pump;
   a water level sensor coupled to the sump pump;
   a mechanical shaker coupled to the sump pump; and
   a pump analyzer, including a memory having instructions for execution on one or more processors, the instructions, when executed by the one or more processors, cause the pump analyzer to:
      determine if a current water level in a sump basin in which the sump pump is disposed has surpassed a set water level as determined by the water level sensor, the water level sensor placed a short distance above the set water level;
      in response to determining that the current water level in the sump basin has surpassed the set water level, specify a plurality of operating cycles and accordingly activating the mechanical shaker to shake the sump pump in order to produce vibrations in the sump pump to shake loose one or more of a jam, a stall, a malfunction, or a debris build-up in the sump pump, wherein each operating cycle of the mechanical shaker has a specified duration, activate the mechanical shaker for one or more of the operating cycles, and at the end of the specified duration in each operating cycle determine if the current water level in the sump basin is acceptable;
      in response to determining that the current water level in the sump basin has not surpassed the set water level, determine potential problems associated with sump pump by analyzing a motor of the sump pump as activated by the one or more processors; and
      in response to determining that the current water level in the sump basin is not acceptable at the end of the plurality of operating cycles as executed by the shaker of the sump pump, sending an alarm message to notify a user.

16. The system of claim 15, wherein the instructions of the pump analyzer, when executed by the one or more processors to determine potential problems associated with the sump pump include instructions for analyzing the motor to detect signatures that indicate potential problems with the motor, and when the signatures that indicate potential problems with the motor are detected, activating the mechanical shaker attached to the sump pump for another one or more operating cycles.

17. The system of claim 15, wherein the instructions to determine if the current water level in the sump basin is acceptable include instructions of the pump analyzer, when executed by the one or more processors, further cause the pump analyzer to:
   determine if the current water level in the sump basin has dropped to below the set water level at the end of the one or more operating cycles.

18. The system of claim 16, wherein the instructions of the pump analyzer, when executed by the one or more processors, further cause the pump analyzer to:
   analyze the motor to determine if the signatures that indicate potential problems with the motor are still present at the end of the another one or more operating cycles; and
   in response to determining that the signatures that indicate potential problems with the motor are still present at the end of the another one or more operating cycles, provide an alert message to the user.

19. The system of claim 16, wherein the instructions of the pump analyzer, when executed by the one or more processors to analyze the motor to detect signatures that indicate potential problems with the motor further include instructions to perform one or more of: (i) a frequency analysis on an electrical load waveform of the motor; (ii) a comparison between the electrical load waveform of the motor and one or more reference waveforms; or (iii) an evaluation of values associated with the electrical load waveform of the motor.

20. The system of claim 15, wherein the mechanical shaker is attached to the sump pump.

21. The system of claim 15, wherein the mechanical shaker is integrated with the sump pump.

* * * * *